United States Patent
McDonald

[15] 3,655,565

[45] Apr. 11, 1972

[54] ELECTRICALLY INSULATING COMPOSITIONS OF DIELECTRIC POLYMER, MICA FLAKES AND SILICONE RESIN

[72] Inventor: Joseph L. McDonald, St. Paul, Minn.

[73] Assignee: Minnesota Mining and Manufacturing Company, St. Paul, Minn.

[22] Filed: Jan. 7, 1970

[21] Appl. No.: 1,283

[52] U.S. Cl..............................252/63.2, 117/232, 252/63.5, 252/63.7, 260/37 SB, 260/39 SB, 260/824, 260/827, 161/171
[51] Int. Cl..........................................H01b 3/04, H01b 3/46
[58] Field of Search..............252/63.5, 63.7, 63.2; 117/230, 117/232, 135.1, 127; 260/37 R, 37 SB, 39 SB, 46.5 R, 40 R; 161/163, 170

[56] References Cited

UNITED STATES PATENTS

| 3,520,845 | 7/1970 | McKeown | 260/37 |
|---|---|---|---|
| 3,487,123 | 12/1969 | Bauer | 117/232 X |
| 2,568,004 | 9/1951 | Heyman | 252/63.7 X |
| 2,809,952 | 10/1957 | Bolson | 252/63.5 X |
| 2,997,776 | 8/1961 | Matter | 252/63.5 X |
| 3,440,207 | 4/1969 | Nitzsche | 260/37 |
| 3,464,950 | 9/1969 | Wegehaupt | 260/37 |

*Primary Examiner*—John T. Goolkasian
*Assistant Examiner*—M. E. McCamish
*Attorney*—Kinney, Alexander, Sell, Steldt & Delahunt

[57] ABSTRACT

Compositions suitable as electrical insulation comprised of synthetic dielectric polymer, mica flakes having specific surface area of about 7 square meters per gram or greater and a minor amount of a silicone resin that is substantially compatible but not reactive with the polymer. The compositions can withstand high electrical voltages over extended periods of time (being extremely resistant to corona breakdown) and also have good mechanical properties (e.g., toughness, strength and flexibility).

8 Claims, No Drawings

ELECTRICALLY INSULATING COMPOSITIONS OF DIELECTRIC POLYMER, MICA FLAKES AND SILICONE RESIN

There is an increasing need in the field of insulation for materials which can withstand high electrical voltages over extended periods of time. Good mechanical properties, (e.g. toughness, strength and flexibility) are also generally needed in these materials, for ease of fabrication as well as for dependability in use. Thus, if tough, flexible electrical insulating materials could be prepared with higher resistance to high-voltage corona attack, the insulation for such high-voltage electrical equipment as rotating machines, transformers, insulated cables and cable accessories, and electronic power supplies could often be provided less expensively and with more assurance of long life. In some cases insulating materials must resist high operating temperatures as well as voltages in excess of the corona starting voltage.

Conventional polymeric insulations have had the desired toughness, strength and flexibility but have often failed in high-voltage applications because of their limited resistance to corona attack. Certain inorganic materials (e.g. flakes or platelets of mica or glass) are, on the other hand, known to have excellent resistance to corona but have relatively poor mechanical properties thus making fabrication difficult and sometimes leading to mechanical failure during use. Furthermore, the polymers and flakes have proved difficult to combine and constructions containing both have long been unsuccessful, the shortcomings of one or the other (or both) being present to a considerable degree. For example, attempts to impregnate sheets of dielectric inorganic flakes (e.g. mica papers) with high molecular weight polymers have resulted in sheets having outer layers largely of the polymer with a layer of the dielectric flakes remaining essentially unimpregnated between. Such structures are weak and prone to delamination in the central layer.

Recently, however, progress has been made in the high-voltage insulation field. Sheet materials have been successfully prepared of electrically insulating polymers containing mica and other inorganic flakes substantially oriented in the plane of the insulation sheet which take advantage of the desirable properties of both (see the copending commonly assigned patent application of McKeown and Toner, Ser. No. 821,128, filed May 1, 1969 now U.S. Pat. 3,528,845.

It has also now been found that intimate mixtures of synthetic dielectric polymers and of high specific surface area micas (both of the types utilized in the present invention and as described hereinafter, especially where the mica has a specific surface area of 30 square meters per gram or greater) in which the mica particles are not oriented with respect to the insulation sheets have particularly desirable corona life properties.

The present invention represents a further development in this field and relates to a particular combination of three components: a dielectric polymer, a certain type of mica flakes, and an especially defined silicone resin. The compositions of the invention are highly synergistic relative to their electrical insulating properties, especially in their resistance to corona. Thus, the relevant properties of the compositions of the invention are far superior to those of the individual components as well as to the properties of the combination which might be expected, absent the teachings of this specification. The omission of any one of the three components results in a major reduction in the desired properties, as will be shown.

It is another object of the invention to provide flexible, conformable insulating materials in sheet form.

It is a further object of the invention to provide compositions which are resistant to high temperatures as well as to high voltages and corona over extended periods of time.

It is a further object of the invention to provide a method for preparing compositions of improved resistance to corona.

It is a further object of the invention to provide electrical conductors coated with compositions having relatively long corona endurances.

Other objects of the invention will become apparent to those skilled in the art upon reading the following specification.

The present invention provides electrically insulating compositions having high corona resistance comprising 1. from about 15 to 95 parts of a synthetic dielectric polymer suitable for electrical insulation,
2. from about 5 to 80 parts of mica flakes having a specific surface area of about 7 square meters per gram or greater (but preferably 10 square meters or greater) dispersed in the polymer.
3. from about one to 20 parts of a silicone resin that
   a. is substantially compatible with the polymer of (1);
   b. is substantially not reactive with the polymer of (1) under processing conditions used for the composition,
   c. has on the average at least five silicon atoms in each resin molecule,
   d. has on the average at least 0.1 branch for each silicon atom in the resin molecule, and
   e. has the formula

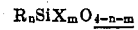

$$R_n Si X_m O_{\frac{4-n-m}{2}}$$

where R is a monovalent hydrocarbon radical, X is a hydroxyl or alkoxy radical, the sum of $n$ and $m$ is less than 3, and $m$ is less than 1.

provided that components (), (2) and (3) total 100 parts (the parts being by weight).

Preferably the compositions contain 35-60 parts of the dielectric polymer, 40-60 parts of mica and five to 10 parts of the silicone resin (the total of the three being 100 parts) since corona resistance and physical properties are optimized in this range.

In addition to the foregoing required constituents in the compositions of the invention other materials, such as fillers, coloring pigments, stabilizers, plasticizers, antioxidants, lubricants, etc., can also be included therein if desired.

The compositions in solvent dispersed liquid form may be impregnated into fabric, cast, calendared, or otherwise formed into or onto sheeting or coated on wire conductors. In liquid form the compositions are also useful for coating purposes. The compositions may also be used as solid fusible powder, applied by various fluidized bed methods. Thermoplastic and thermosetting compositions of the invention are useful for molding insulative housings. The forms in which the compositions are conveniently available will depend to some extent upon the components (particularly the dielectric polymer) and the relative amounts of each present.

The compositions combine excellent mechanical properties with electrical properties which enable them to operate in high-voltage environments as previously noted. They are particularly useful in sheet form as electrical insulation in motor slot liners, motor phase insulations, transformers, capacitors, and coil, wire and cable wrappings. The sheets of the present invention can be prepared in any desired lengths. Normally, they are prepared in long lengths and wound into rolls.

It is of importance in obtaining the excellent mechanical properties of the compositions of the invention, particularly when they are utilized in the form of flexible sheets or films, that the polymer surrounds and intimately contacts (wets) the individual mica flakes therein. Thus, the individual flakes are preferably separated by polymer rather than being in contact with one another.

The synthetic dielectric polymers of the composition of the present invention may include one or more of a variety of organic electrically insulating polymers, which may be generally defined as those organic polymers that exhibit room-temperature direct-current electrical resistivities in excess of $10^{10}$ ohm-centimeters and dielectric strengths in 50-mil thicknesses of at least 250 volts/mil.

These polymers include vinyl polymers and copolymers, such as polyvinyl chloride, polyvinylidene chloride, polyvinyl acetate, and polystyrene; polyolefins such as polyethylene and polypropylene (representative of thermoplastic polymers of relatively low thermal resistance); polyesters such as polyethylene terephthalate; polyacrylates including polyacrylic elastomers and polyacrylate varnishes; polyurethanes; epoxy resins including epoxy polyesters (representative of thermosetting polymers of moderate thermal resistance); phenol-aldehyde resins; polycarbonates; polysulfones; fluoroplastics, such as polyvinylidene fluoride and polychlorotrifluoroethylene; and natural and synthetic elastomers such as ethylene-propylene elastomers and isobutylene elastomers.

Another range of polymers useful in the compositions of the invention are high-temperature resistant polymers which may be defined as wholly synthetic polymers having a highly aromatic structure containing hetero linkages, which when hardened have a softening temperature greater than 100° C. and a weight loss as determined by thermogravimetric analysis in flowing nitrogen with a temperature increase of 2-½° C. per minute of less than 10 percent at 400° C. Among such polymers are aromatic polyimides, polyamides, polysulfones, polyethers (e.g. poly(phenylene oxides)), polyesters, polythioethers, polyketones, etc. The high temperature resistant polymers preferred for use in these compositions are wholly synthetic polymers having a highly aromatic structure containing hetero linkages and are selected from aromatic polyimides, polyamides, polysulfones, and polyethers.

In some cases two polymers are included in the synthetic dielectric polymer portion of the compositions that are reactive with one another or one of the base polymers may be curable by reaction with a curing agent or by reaction with itself. In other insulating compositions one or more organic polymers that are not reactive are included in the base material.

The polyimides are the most preferred polymers in the products of the invention as sheets containing them have excellent mechanical and electrical properties as well as resistance to heat. Polyimides useful in the practice of the invention can be prepared, for example, by reacting a diamine having a divalent group containing at least two carbon atoms with a tetracarboxylic acid dianhydride containing a tetravalent group containing at least two carbon atoms, with no more than two carbonyl groups of the dianhydride radical being attached to any one carbon atom of the tetravalent group, whereby a polyamide (polyamic) acid composition is formed which is then converted to the polyimide by chemical or heat treatment. Reference is made to U.S. Pat. Nos. 3,179,632 and 3,179,634 and South African Pat. No. 60/1040 with respect to these polymers.

Preferably the tetracarboxylic acid dianhydride radicals contain a tetravalent group containing at least six carbon atoms and having benezenoid unsaturation, each of the four carbonyl groups of the dianhydride radical being attached to a separate carbon atom in the tetravalent group, the carbonyl groups being in pairs in which the groups in each pair are attached to adjacent carbon atoms of the tetravalent group. Another useful class of dianhydride is those containing heterocyclic rings.

The organic diamines useful in preparing the polyimides have the structural formula $H_2N-R'-NH_2$, wherein $R'$ is a divalent radical containing at least two carbon atoms, which may be aromatic, heterocyclic, aliphatic, cycloaliphatic, or a combination thereof. These groups can be substituted with halo, $R''-$, $R''-$, $R''S-$ and the like groups, wherein $R''$ is hydrocarbon containing up to six carbon atoms. The most useful diamines are the primary diamines which, upon reaction with a dianhydride, provide the polyamide-acids which are converted into the polyimides. The preferred $R'$ groups in the diamines contain benzenoid unsaturation.

Polyamides useful in the practice of the invention can be prepared by reacting diamines such as previously defined with aromatic orthomonoanhydride-monoacid chlorides (such as the orthomonoanhydride-monoacid chloride of trimellitic acid). These polymers are embraced within the general term "polyamide" as utilized herein although they also contain polyimide groups and could also be thought of as polyimide-amides.

The mica flakes suitable for the compositions of the invention have high specific surface area, i.e. a surface area in excess of 7 square meters per gram ($m^2/g$), e.g. from 7 to 700 square meters per gram with certain kinds of mica. Preferably, the mica flakes have specific surface areas in the range of from about 10 to 100 square meters per gram, however.

Mica suitable for the present compositions can be conveniently prepared by the process disclosed in the copending commonly assigned patent application of Josef Ruzicka, Ser. No. 650,543, filed June 30, 1967.

The silicone materials added to the base organic electrically insulating materials according to the present invention are generally classified as "resins" and may be distinguished from silicone fluids and silicone rubbers by the higher branching of their polymer molecules. A molecule of one of the useful silicone resins that includes ten silicon atoms will likely have at least one branch, and may have two or more. Smaller resin molecules may or may not have branching, but upon dividing the number of branches in a whole sample of the useful resin by the number of silicon atoms in the sample, it will be found that on the average there is at least 0.1 branch for each silicon atom in the resin molecule, and preferably at least 0.2 branch for each silicon atom. This degree of branching provides the needed degree of compatibility between the silicone resin and the synthetic dielectric polymer, which is necessary to properly distribute the silicone resin molecules.

The polymer molecules of useful silicone resin have on the average at least five, and preferably at least 10, silicon atoms to reduce any tendency for the resin to evaporate during processing or use. Because of the branched nature of the useful silicone resins, the ratio of hydrocarbon radicals to silicon atoms — $n$ in the formula above — will generally be less than 2; most often it will be between about 1.2 and 1.8. Also, the ratio of hydroxyl or alkoxy groups to silicon atoms — $m$ in the formula above — should be less than one; if the number of hydroxyl or alkoxy groups per silicon atom were greater than one, the reactivity of the silicone resin with itself or with the base polymer would be too high. The further requirement for $n$ and $m$ in the formula above, that their sum be less than three, follows from the fact that the resin is a siloxane polymer.

The hydrocarbon radicals attached to the siloxane backbone in the useful silicone resins generally are monovalent aliphatic radicals or phenyl radicals. Methyl radicals especially, but in addition ethyl and vinyl radicals, are the preferred aliphatic radicals since they do not sterically hinder or hide the main siloxy molecular backbone to the extent that longer radicals would.

Thus, in summary, the silicone resin should be substantially not reactive with the synthetic dielectric polymer. It should not, for example, react into a cross-linked network of the synthetic dielectric polymer nor should it react with other constituents to any substantial degree. Also, the silicone resins are distinguished from silicone oils or silicone elastomers in that the described branching of the resins makes them stably miscible or dispersible in organic polymers during processing. Specific suitable resins include hydrolyzate-type branched silicone resins prepared by condensation of mixed methyl and phenyl chlorosilanes available under such trade designations as Dow Corning 840, Dow Corning 804, Dow Corning 805, Dow Corning R-4281, Dow Corning R-5581, and GE SR28.

The following examples are offered to furnish a better understanding of the present invention, and are not to be construed as in any way limiting thereof. All parts are by weight unless otherwise specifically indicated. The word "mil" herein indicates 0.001 inch.

A number of controls are included for comparison in the examples in which one or more of the components of the compositions of the invention are omitted or fall without the definition of the corresponding component of the compositions of the invention. It should be particularly noted that the corona life of insulating materials is very greatly reduced with small increases in the electrical stress (measured in volts per mil). Specifications for various tests referred to herein are as follows:

Polymer softening temperature (also known as the Vicat softening point test). This procedure is described in the ASTM standards and has the test number ASTM D-1525. As used herein, the softening temperature is the temperature at which a flat-ended needle having a 1 mm by 1 mm square cross section will penetrate a specimen (having lateral dimensions not less than 0.75 inch and a thickness of 0.125 inch) under a load of 1000 grams and at a uniform temperature rise of 50° C. per hour.

The TGA (thermogravimetric analysis) weight loss test. This procedure is described fully in the Armed Services Technical Information Agency document AD 275,567, entitled "Thermogravimetric Analysis of Polymers" by Ehlers. As used herein, the test is run in flowing nitrogen with a temperature increase of 2-½° C. per minute.

The mica surface area test. A continuous flow modification (described in Analytical Chemistry, Volume 30, page 1387, 1958 by F. M. Nelsen and F. T. Eggertsen) of the BET method (proposed by S. Brunauer, P. H. Emmet, and E. Teller in *Journal of the American Chemical Society*, Volume 60, page 309, 1938) is used, featuring the one-point method. The procedure utilizes a measured adsorption of nitrogen on the mica.

The corona life test. The samples to be tested (in sheet form) placed upon a grounded flat copper plate. A ⅝ inch square plate of 15 mil transformer core iron serving as a high-voltage electrode is placed on top of the samples. The copper plate and the samples being tested both extend beyond the periphery of the high-voltage electrode on all sides. The corona discharges occur largely from the edges of the electrode to the samples. The tests are run at 1440 cycles per second, with temperatures and electrical stresses being varied. Relative humidity effects are eliminated by running all tests at 132° C. and ambient humidity (this would amount to a relative humidity of approximately 0 percent due to the higher temperature). Equivalent times at 60 cycles per second obtained by multiplying the observed breakdown time by 24 (1440/60).

Dielectric strength. ASTM D-149 is the base test method utilized. Data is measured using a ¼ inch electrode and a voltage rise of 500 volts per second. Test conditions are 23° C. and 50 percent relative humidity. Breakdown voltage divided by the sample thickness in mils yields the reported volts per mil values.

Tensile strength and elongation. These properties are measured at 23° C. and 50 percent relative humidity by elongating a ¼ inch wide film sample at a rate of 50% per minute until the sample breaks. The force applied at break in pounds per square inch (psi) is the tensile strength. The percent increase in the length of the sample at break is the elongation.

Flex Life (folding endurance). ASTM D-2176 is the base test method used. The test is run on a MIT flex tester at 23° C. and 50 percent relative humidity according to standard procedures. Samples 15 millimeters wide are flexed using a 1.5 kilogram weight. The number of cycles prior to breaking at the crease line is considered the flex life of the material.

EXAMPLE 1

Preparation of a composition according to the invention in which the synthetic dielectric polymer is a polyimide.

A 10 percent solution of the polyamide acid of essentially equimolar amounts of pyromellitic dianhydride and 4,4'-diaminodiphenyl ether in dimethylacetamide with an inherent viscosity of about 3.0 was used as the carrier polymer. (The hardened polyimide produced from this polyamide acid has a softening point greater than 100° C. and a weight loss (TGA) of less than 10 percent at 400° C.) Into 250 gms of the viscous polyamide acid solution (about 200,000 cps as measured on a Brookfield Model LVT Viscometer, No. 4 spindle), were mixed 25 gms of mica platelets having a surface area of 10 square meters per gram, the ratio of mica to polymer solids being 1:1. Mixing, which was by means of a spatula, was continued until a homogeneous mixture was obtained. To this mixture was added 2.6 gms of a silicone resin of the type described previously and available under the commercial designation R-5581 from the Dow Corning Corporation in dimethylacetamide solution at 16 percent solids. This resulted in a composition of 47.5 percent polyamide acid, 47.5 percent mica, 5.0 percent silicone composition based on solids. Effective viscosity of the mixture was reduced by adding sufficient dimethylacetamide to yield a final solids content of 15 percent in the mixture. After evacuation of the sample to remove air bubbles caused by stirring, this material was solvent cast onto a glass plate, submerged in a 1:1 mole ratio pyridine-acetic anhydride bath to effect imidization of the polyamide acid and dried in frames to prevent shrinkage at 150° C. for 5 minutes, followed by 370° C. for 3 minutes. A tough, flexible film resulted.

EXAMPLES 2–5

Preparation of additional polyimide compositions according to the invention but varying the ratios of the constituents.

These examples were prepared utilizing the same method and the same constituents as in Example 1, but varying the relative amounts thereof. The compositions of the resulting materials (in parts by weight, solids basis) are shown in Table I. Example 1 is included for comparison.

TABLE I

| Example | Polymer (1) | Mica | Silicone Resin |
| --- | --- | --- | --- |
| 1 | 47.5 | 47.5 | 5 |
| 2 | 49 | 50 | 1 |
| 3 | 45.5 | 45.5 | 9 |
| 4 | 90 | 5 | 5 |
| 5 | 17 | 78 | 5 |

(1) Based upon polyamide acid solids

EXAMPLE 6

Preparation of a composition of the invention in which the synthetic dielectric polymer is an epoxy-polyester.

A 33 percent solids solution in toluene of a catalyzed prereacted epoxy-polyester resin was used (a branched chain acid-terminated polyester consisting of adipic acid, isophthalic acid, propylene glycol, and trimethylolpropane partially reacted with a diglycidyl ether of Bisphenol A as described in Example 2 of U.S. Pat. No. 3,027,279). The epoxy-polyester resin solution was hand-mixed with sufficient mica particles having a surface area of 10 square meters per gram to bring the ratio of mica to polymer to 1:1. After a homogeneous mixture was formed, a solution of the silicone resin described in EXAMPLE 1 (50 percent solids in toluene) was added to yield a final mixture (based on solids) of 47.5 percent epoxy-polyester, 47.5 percent mica, and 5 percent silicone. The mixed material was coated on two mil starch sized style 108 glass cloth by dipping the glass cloth in the coating solution, followed by contacting with metering bars to control pickup. Two coating trips, each followed by a 104° C., 10-minute solvent removal cycle, yielded a very flexible 5–6 mil B-stage composition. Layer-to-layer bonding was seen on half-lapped rectangular bars after a 30-minute cure cycle at 204° C.

EXAMPLE 7

Preparation of a composition of the invention in which the synthetic dielectric polymer is polyethylene.

A low density polyethylene (available under the trade designation Alathon 10 from the I. E. DuPont Co.) was combined with mica having surface of 10 square meters per gram and silicone resin as described in Example 1 through the following process: Pellets of the polyethylene about one-eighth inch in diameter were introduced into a mill at a temperature of 127° C. After fusion of this material to a homogeneous mass, the mica particles were slowly added and blended into the polymer. After this addition was complete, the silicone resin was added in the same manner. A total milling time of about 30 minutes was necessary to obtain a uniform mixture of the three components. The composition of the sheets removed from the mill was 57 percent polyethylene, 38 percent mica, and 5 percent silicone. Corona test samples were obtained by pressing the milled sheets for 30 minutes at 150° C. and 700 psi. Pressed sheet thickness of about 150 mils was obtained. The sheets were flexible, cracking only when creased at 180°.

EXAMPLE 8

Preparation of a composition of the invention in which the synthetic dielectric polymer is an ethylene-propylene rubber.

An ethylene-propylene rubber (an ethylene-propylene copolymer including 55 weight percent ethylene and having a Mooney viscosity between 35 and 45 and a specific gravity of 0.86 and available from the Enjay Company under the trade designation Vistalon 404) was combined with mica having a surface area of 10 square meters per gram and silicone resin as described in Example 1 through a process similar to that used in Example 7. In this case, however, milling took place with the mill at a temperature of 24° C. The same sequence of materials addition was used. After the 30 minutes of milling, frictional heat had caused the mill to heat up to about 54° C. The composition of the sheets removed from the mill was 58 percent rubber, 37 percent mica and 5 percent silicone. Milled sheets were pressed at 150° C. for 30 minutes and 700 psi to obtain material for corona tests. The resulting samples were about 150 mils thick and were very flexible and conformable.

EXAMPLE A-E

Preparation of control lots (which do not fall within the scope of the invention) for comparison with Examples 1–5.

These were prepared by the same method as the previous examples, and except where otherwise specified, the same constituents. The specific compositions are given in Table II.

TABLE II

| Example | Polyamide Acid (1) | Mica | Silicone Resin |
| --- | --- | --- | --- |
| A | 100 | 0 | 0 |
| B | 95 | 0 | 5 |
| C | 50 | 50 (2) | 0 |
| D | 47.5 | 47.5 (3) | 5 |
| E | 47.5 | 47.5 (4) | 5 |

1. Based upon polyamide acid solids.

2. Mica having a surface area of 10 m²/g.

3. Coarse mica particles (−120 + 325 mesh size range) obtained through dry grinding dehydrated muscovite mica.

4. Mica having a surface area of about 3 m²/g. and a non-platelet structure.

EXAMPLES F-K

Preparation of control lots for comparison with Examples 6–8.

These were prepared by the methods and utilizing the constituents described in the one of Examples 6–8 in which the same polymer was used.

The specific compositions are given in TABLE III.

TABLE III

| Example | Polymer Type | Amount | Mica | Silicone Resin |
| --- | --- | --- | --- | --- |
| F | The epoxy-polyester described in Ex. 6 | 100 | 0 | 0 |
| G | Same | 50 | 50 | 0 |
| H | The polyethylene described in Ex. 7 | 100 | 0 | 0 |
| I | Same | 60 | 40 | 0 |
| J | The ethylene-propylene rubber described in Ex. 8 | 100 | 0 | 0 |
| K | Same | 60 | 40 | 0 |

The results of corona life tests run on the compositions of the various examples are summarized, together with the compositions thereof in TABLE IV. The values measured on the controls (the lettered examples) are arranged as near as possible to the values on the respective lots of the invention (the numbered examples). A plus (+) sign following the corona life value indicates that the test is in progress and failure has not occurred.

The relative amounts of constituents in the compositions containing polyimide have been adjusted to polyimide solids (rather than polyamide acid solids).

TABLE IV

| | Composition | | | | Corona test results | |
| --- | --- | --- | --- | --- | --- | --- |
| | Polymer | | | Silicone resin | Stress, volts/ mil | Failure, hrs. equiv. 60 cps. |
| Example | Type | Amount | Mica | | | |
| 1 | Polyimide | 45.3 | 49.5 | 5.2 | 198 | 33,408 |
| | | | | | 185 | 32,016 |
| | | | | | 130 | 91,416+ |
| | | | | | 120 | 82,440+ |
| | | | | | 101 | 91,416+ |
| | | | | | 93 | 82,440+ |
| A | do | 100 | 0 | 0 | 200 | 264 |
| | | | | | 100 | 1,056 |
| B | do | 94.5 | 0 | 5.5 | 108 | 1,608 |
| | | | | | 95 | 3,192 |
| C | do | 47.8 | 52.2 | | 116 | 1,152 |
| D | do | 45.3 | ¹49.5 | 5.2 | 100 | 42,672 |
| | | | | | 95 | 52,392 |
| | | | | | 87 | 75,288 |
| E | do | 45.3 | ²49.5 | 5.2 | 172 | 768 |
| | | | | | 126 | 7,296 |
| | | | | | 98 | 49,752 |
| 2 | do | 46.8 | 52.2 | 1 | 190 | 672 |
| | | | | | 112 | 6,384 |

TABLE IV—Continued

| | Composition | | | | Corona test results | |
|---|---|---|---|---|---|---|
| | Polymer | | | Silicone resin | Stress, volts/mil | Failure, hrs. equiv. 60 cps. |
| Example | Type | Amount | Mica | | | |
| 3 | do | 43.3 | 47.3 | 9.4 | 224 | 41,712 |
| | | | | | 168 | 87,504 |
| | | | | | 102 | 114,720+ |
| | | | | | 91 | 114,720+ |
| 4 | do | 89.2 | 5.4 | 5.4 | 185 | 744 |
| | | | | | 112 | 11,520 |
| 5 | do | 15.8 | 79.1 | 5.1 | 207 | 2,088 |
| | | | | | 145 | 9,024+ |
| | | | | | 103 | 9,408+ |
| 6 | Epoxy-polyester | 47.5 | 47.5 | 5 | 150 | 2,352 |
| | | | | | 104 | 19,152+ |
| | | | | | 103 | 19,152+ |
| | | | | | 84 | 19,152+ |
| F | do | 100 | 0 | 0 | 162 | 48 |
| | | | | | 89 | 505 |
| G | do | 50 | 50 | 0 | 133 | 216 |
| | | | | | 100 | 1,032 |
| | | | | | 95 | 10,512 |
| 7 | Polyethylene | 57 | 38 | 5 | 190 | 9,600+ |
| | | | | | 170 | 9,600+ |
| H | do | 100 | 0 | 0 | 170 | 336 |
| I | do | 60 | 40 | 0 | 208 | 216 |
| | | | | | 188 | 600 |
| | | | | | 180 | 1,176 |
| 8 | Ethylene-propylene rubber | 58 | 37 | 5 | 169 | 9,600+ |
| | | | | | 175 | 9,600+ |
| J | do | 100 | 0 | 0 | 146 | 168 |
| K | do | 60 | 40 | 0 | 168 | 1,824 |

¹ Coarse muscovite mica, —120+325 mesh.
² Coarse mica of non-platelet structure, surface area about 3 m.²/g.

A particularly preferred class of the compositions of the invention are those comprising 45–50 parts of polyimide, 45–50 parts of mica and 4.5–5.5 parts of silicone resin (the three totaling 100 parts). The preferred form of these compositions is sheets. Example 1 is representative of these preferred materials.

In evaluating the corona data in TABLE IV, it should be remembered that the corona life is generally reduced greatly by relatively small changes in the electrical stress, particularly at the higher stresses. Comparisons between corona lives must therefore be made at equal or almost equal electrical stresses. The following are noted:

1. The corona life of Example 1 is far superior to the lives of control Examples A–C. The lives of A, B and C at stresses of 100–116 run between 1,000 and 2,000. At the same order of stress, Example 1 has a life of greater than 90,000.

2. The corona life of Example 1 is also far superior to the lives of controls D and E (which differ from it only in the particle size of the mica). D and E are comparable at stresses of about 100 (lives in the range of 40,000 to 50,000) while Example 1 has not failed at 90,000. A more meaningful comparison (since both tests are completed) shows that E has a life of 768 at a stress of 172 while Example 1 has a life of 32,000 at a stress of 185.

3. Examples 1, 2, 3 and C show that although higher corona lives are achieved if more than 1 percent silicone is used, even the 1 percent silicone increases the corona life at a stress of 112–116 by a factor of about six.

4. Examples 1,4,5 and B show that although better corona results are achieved if more than about 5 percent mica is used, even the about 5 percent mica increases the corona life at a stress of 108–112 from about 1,600 to greater than 11,000.

5. Examples 6, 7 and 8 and the pertinent controls (Examples F–K) show the advantages of the present invention in corona applications when other types of polymers are used, the epoxy-polyester being a thermosetting polymer of moderate thermal resistance, polyethylene being a thermoplastic polymer of relatively low thermal resistance and the ethylene-propylene rubber being an elastomer. The polyimide of Examples 1 and following is a highly thermally-resistant polymer.

Other mechanical and electrical properties of various examples of the inventions are presented in Table V showing them to be generally tough, flexible, dense, void-free materials.

TABLE V

| Example | Sample thickness, mils | Tensile strength, p.s.i. | Elongation, percent | Flex life cycles | Dielectric strength, volts/mil |
|---|---|---|---|---|---|
| 1 | 4.0 | 7,100 | 30 | 547 | 1,677 |
| 2 | 5.4 | 7,200 | 19 | 953 | 1,400 |
| 3 | 2.4 | 8,700 | 38 | 1,464 | 2,530 |
| 4 | 1.4 | 12,500 | 75 | 7,312 | 4,400 |
| 5 | 3.7 | 3,130 | 10 | 5 | 1,500 |

What is claimed is:

1. An electrically insulating composition having high corona resistance comprising
   1. from about 15 to 95 parts of a synthetic dielectric polymer suitable for electrical insulation,
   2. from about five to 80 parts of mica flakes having a specific surface area of about 7 square meters per gram or greater dispersed in the polymer,
   3. from about one to 20 parts of a silicone resin that
      a. is substantially compatible with the polymer of (1),
      b. is substantially not reactive with the polymer of (1) under processing conditions used for the composition,
      c. has on the average at least five silicon atoms in each resin molecule,
      d. has on the average at least 0.1 branch for each silicon atom in the resin molecule, and
      e. has the formula

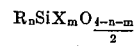

where R is a monovalent hydrocarbon radical, X is a hydroxyl or alkoxyl radical, the sum of $n$ and $m$ is less than 3, and $m$ is less than 1.
provided that components (1), (2) and (3) total 100 parts.

2. A composition according to claim 1 wherein the synthetic dielectric polymer is a polyimide.

3. A composition according to claim 2 wherein the mica has a specific surface area of from 10 to 100 square meters per gram.

4. A composition according to claim 1 wherein the mica has a specific surface area of from 10 to 100 square meters per gram.

5. A composition according to claim 1 in sheet form.

6. An electrically insulating composition having high corona resistance comprising
1. from about 35 to 60 parts of a synthetic dielectric polymer suitable for electrical insulation,
2. from about 40 to 60 parts of mica flakes having a specific surface area of about 7 square meters per gram or greater dispersed in the polymer,
3. from about five to 10 parts of a silicone resin that
   a. is substantially compatible with the polymer of (1),
   b. is substantially not reactive with the polymer of (1) under processing conditions used for the composition,
   c. has on the average at least five silicon atoms in each resin molecule,
   d. has on the average at least 0.1 branch for each silicon atom in the resin molecule, and
   e. has the formula $$R_nSiX_mO_{\frac{4-n-m}{2}}$$

where R is a monovalent hydrocarbon radical, X is a hydroxyl or alkoxyl radical, the sum of $n$ and $m$ is less than 3, and $m$ is less than 1.
provided that components (1), (2) and (3) total 100 parts.

7. An electrically insulating composition having high corona resistance comprising
1. from about 45 to 50 parts of a polyimide,
2. from about 45 to 50 parts of mica flakes having a specific surface area of 10 to 100 square meters per gram dispersed in the polymer,
3. from about 4.5 to 5.5 parts of a silicone resin that
   a. is substantially compatible with the polymer of (1),
   b. is substantially not reactive with the polymer of (1) under processing conditions used for the composition,
   c. has on the average at least five silicon atoms in each resin molecule,
   d. has on the average at least 0.1 branch for each silicon atom in the resin molecule, and
   e. has the formula $$R_nSiX_mO_{\frac{4-n-m}{2}}$$

where R is a monovalent hydrocarbon radical, X is a hydroxyl or alkoxy radical, the sum of $n$ and $m$ is less than 3, and $m$ is less than 1.
provided that components (1), (2) and (3) total 100 parts.

8. A composition according to claim 7 wherein the polyimide is a reaction product of pyromellitic dianhydride and 4,4'-diaminodiphenyl ether.

* * * * *